Dec. 2, 1941.  R. B. BRYANT ET AL  2,264,562
APPARATUS FOR FILLING CONTAINERS WITH MEASURED AMOUNTS OF FLUID
Filed Aug. 8, 1939
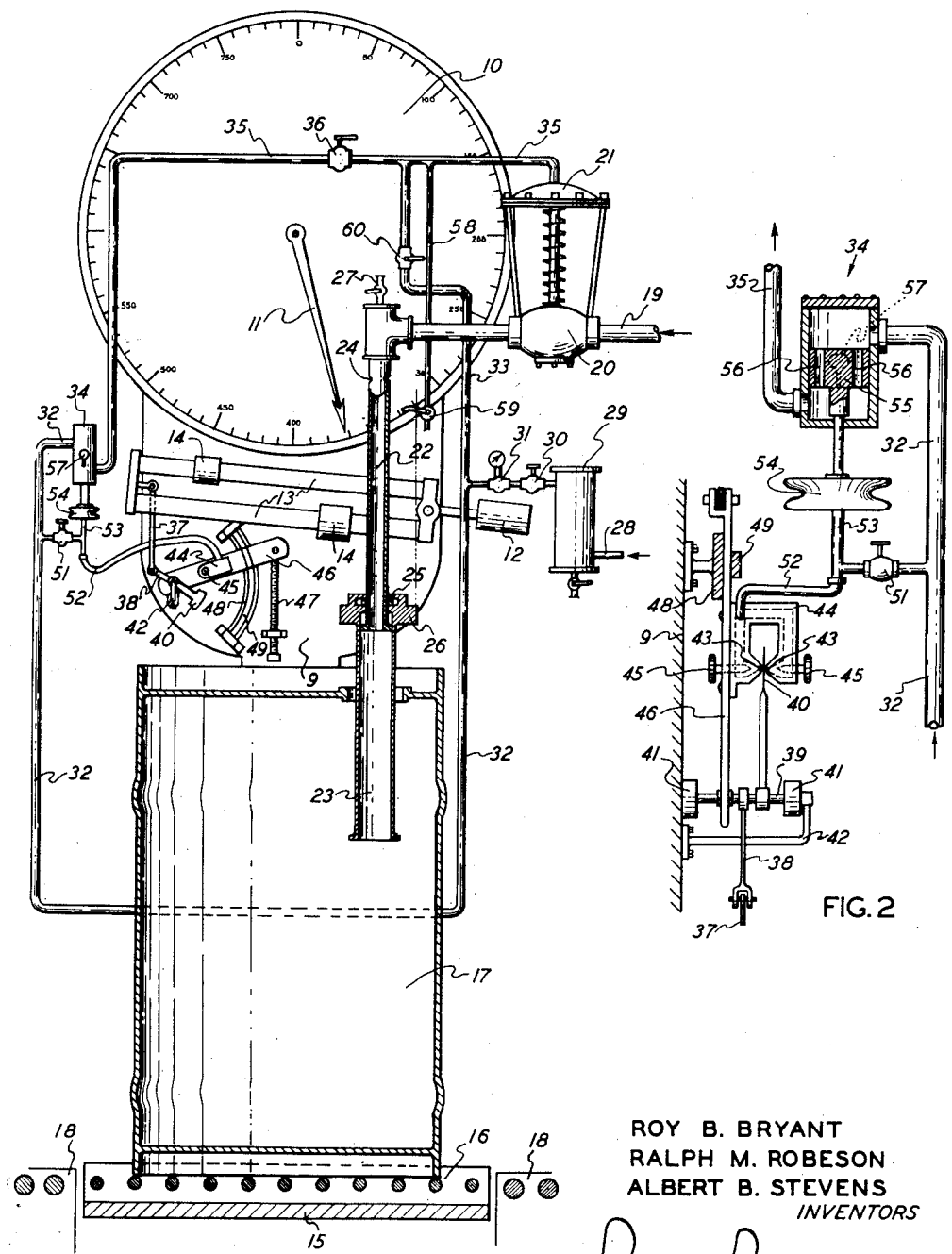
ROY B. BRYANT
RALPH M. ROBESON
ALBERT B. STEVENS
INVENTORS
Paul W. Prigman
ATTORNEY Patented Dec. 2, 1941

2,264,562

UNITED STATES PATENT OFFICE 2,264,562

APPARATUS FOR FILLING CONTAINERS WITH MEASURED AMOUNTS OF FLUID

Roy B. Bryant, Huntington Park, Ralph M. Robeson, Long Beach, and Albert B. Stevens, San Gabriel, Calif., assignors to Socony-Vacuum Oil Company, Incorporated, New York, N. Y., a corporation of New York Application August 8, 1939, Serial No. 288,996

2 Claims. (Cl. 249—55)

Our invention relates to the art of filling containers, especially drums, barrels, and the like, to predetermined net weights of fluid content. The apparatus is particularly suitable for use with or in the vicinity of volatile, inflammable liquids.

It is desirable for our purpose to arrange in combination a platform scale, a fluid-supply line adapted for filling drums, a valve in the supply line, and means for automatically shutting off the fluid stream when the beam of the scale reaches a predetermined position. Mechanical actuation of the valve, such as might be controlled by a trigger released by the scale beam or by a similar mechanism, is impractical because it is not possible to require the motion of the beam to do a perceptible amount of work without destroying the accuracy of the scale. Electrical actuation of the valve, controlled by a photoelectric cell and a beam of light arranged to be intercepted by the scale beam, might give satisfactory results, but it would be unsuitable for an important group of applications since preferred practice demands that there be no electrical installation of any kind near to exposed liquids which are volatile and inflammable. We have discovered that a pneumatic system, which will be fully described hereinafter, gives excellent results and avoids the disadvantages of mechanical and electrical actuation.

Furthermore, we have devised certain features in the construction and arrangement of parts of our apparatus which are desirable for accurate and convenient operation and which will appear in the following description and in the drawing, of which:

Figure 1 is a diagrammatic representation of our apparatus, partially in elevation and partially in vertical section, and Figure 2 is a diagram, partially in section, showing more clearly the nature of the pneumatic control.

Referring to the drawing, we employ a platform scale having the housing 9, dial 10, hand 11, counterweight 12, beam 13, sliding weights 14—14, and platform 15, the platform being provided with section 16 of roller conveyor. The detail and interior construction of the scale itself are not shown, being conventional. But, although the scale is conventional, it is not of the most familiar type; we have preferred to utilize a scale in which the hand moves counterclockwise as more weight is placed on the platform, the direct reading from the dial indicating the difference between the weight on the platform and a desired weight. Such scales are commercially obtainable.

Drums, such as that indicated in section at 17, may be placed upon the platform and removed from it by means of roller conveyors 18—18.

The liquid with which it is desired to fill the drums is supplied under moderate pressure to line 19 which is controlled by valve 20, which valve is actuated by diaphragm motor 21. A pair of vertical, downwardly-directed telescoping tubes 22 and 23 is connected to line 19. The inner, stationary tube 22 is provided with annular groove 24 near its upper end and a spring 25 is fixed within the outer tube 23 near its upper end, the spring and groove being adapted to engage one another in such manner as to hold the outer tube in elevated position against its own weight. The lower end of the inner tubular member is provided with an outward flange which engages an inward shoulder near the upper end of member 23, in order to prevent the pair of telescoping members from falling apart. Also, member 23 has an outward flange 26 near its upper end. This flange serves as a handle for moving the tube up or down and it has another function which will be explained hereinafter.

Air cock 27 is provided for admitting atmospheric air to tube 22 and to the end of line 19 after valve 20 is closed. This cock is useful when drums are being filled to such a level that the lower end of member 23 becomes immersed; it then permits the small amount of liquid held suspended by the barometric effect to drain into the drum.

Line 28 is connected with a source of compressed air (not shown), the air being conducted through dehydrator 29, reducing valve 30, and pressure gauge 31 to lines 32 and 33. Line 32 communicates through piston valve 34 with line 35, the latter leading through normally open valve 36 to diaphragm motor 21.

Connected with the outer end of scale beam 13 is link 37, pivoted at each end, which transmits the motion of the beam to arm 38 which, through axle 39 (shown in Fig. 2), moves blade 40. Axle 39 is supported by bearings 41—41 and mounted on scale housing 9 by member 42. Blade 40 is so positioned as to be moved between the opposed air jets 43—43 by appropriate movement of the scale beam. The air jets are supplied with air through channels (indicated by dotted lines in Fig. 2) in C-shaped part 44, and they may be adjusted by means of needle valves 45—45. C- shaped part 44 is mounted on bar 46, one end of which is pivotally attached to axle 39 and the other end of which is connected with adjustment screw 47. Bar 46 is further supported (slidably) by arcuate members 48 and 49.

The air supplied to jets 43—43 comes from line 32 through reducing valve 51 and line 52. Communicating with line 52 by means of line 53 in expansible vessel 54, adapted to actuate the piston 55 of valve mechanism 34. Vessel 54 is constructed so that it may be expanded by much less pressure than is required to actuate diaphragm motor 21. When air jets 43—43 are unobstructed, there is substantially no pressure within vessel 54 and it maintains its normal contracted shape, holding piston 55 approximately in the position shown in Fig. 2. With the piston so placed air may pass freely from line 32 through channels 56—56 to line 35, thus maintaining pressure in diaphragm motor 21 and holding valve 20 open. When blade 40 begins to come between the air jets, release of air is impeded and pressure begins to build up in vessel 54, expanding it and moving the piston. The first result is the opening of the narrow end of keyhole-shaped exhaust port 57, which bleeds some of the pressure from lines 32 and 35. This reduces pressure in diaphragm motor 21 sufficiently to throttle down the flow of liquid in line 19 but does not reduce pressure in line 32 sufficiently to collapse vessel 54. The throttling down of line 19 results in a slowing of the flow of liquid into drum 17 when the scale beam is closely approaching the predetermined position at which complete closure of valve 20 is desired. Finally the motion of piston 55 entirely closes the end of line 32 and immediately thereafter opens the large end of port 57, rapidly bleeding off the remaining pressure from diaphragm motor 21 and completely shutting off the flow of liquid in line 19.

We have thus provided means for closing valve 20 when a filled drum stands on the platform of the scale. It is also necessary to provide means for keeping the valve closed during the time after the filled drum has been removed from the platform and before the attendant is ready to start filling the next drum. To accomplish this we connect line 35 with line 58 which has at its end bleeder valve 59. The bleeder valve and its handle are so arranged that when outer telescoping member 23 is raised, flange 26 (moving as indicated by the broken line in Fig. 1) strikes the valve handle and opens the valve. This makes it impossible for any substantial amount of pressure to exist within diaphragm motor 21; therefore valve 20 will remain closed, regardless of what happens elsewhere in the apparatus, as long as valve 59 is open. When the attendant is ready to fill another drum, he closes valve 59 by hand.

Line 33, which by-passes the automatic control mechanism, is normally closed by valve 60. This line and valve and also normally open valve 36 have no function in the normal operation of the apparatus, but we have provided them in case it is ever desirable to operate valve 20 independently of the automatic control. By manually opening valve 60 pressure may be admitted to the diaphragm motor and valve 20 thereby opened. When valve 60 is being used, it may be desirable to close valve 36, partially or completely, in order to prevent too great loss of pressure through port 57.

In the operation of our device valve 30 should be opened sufficiently to provide enough pressure to the lines beyond it to operate valve 20, but not much more. The particular setting required depends on the construction of the diaphragm and its spring and upon the amount of pressure loss in the lines, especially through air jets 43—43. As an example, the setting may be such as to produce a reading of twenty pounds on pressure gauge 31. A satisfactory adjustment being obtained, a note may be made of the reading of gauge 31 for convenience in resetting in case there is a fluctuation in the air supply or in case valve 30 is used for shutting off the air when the device is to be left standing idle.

Needle valves 45—45 should be adjusted so that air jets 43—43 are as nearly in prefect balance as possible; however, care must be taken that the flow of air is not too greatly restricted by these valves lest it be impossible to obtain a suitably wide variation of pressure in vessel 54.

Reducing valve 51 should then be set so that, the air jets being unimpeded by blade 40, there is but slightly over atmospheric pressure in lines 52 and 53 and in expansible vessel 54. Valve 51 must be sufficiently open so that when the air jets are impeded by blade 40, sufficient air may pass to expand vessel 54.

The motions of beam 13 and hand 11 are, of course, interdependent. The position of C-shaped part 44 is adjusted by means of screw 47 so that the coming of blade 40 between the air jets and the consequent closing of valve 20 occurs when the hand stands at slightly above zero on the dial. To be exact, the adjustment is such that the hand stands at zero after the small amount of liquid remaining in telescoping members 22 and 23 and in the end of line 19 after valve 20 is closed has drained into the drum.

The above-indicated adjustments being once made, they require but infrequent attention, particularly if guarded against accidental derangement.

In using our apparatus, the attendant places an empty drum on the platform of the scale, the opening of the drum uppermost and situated beneath the telescoped members 22 and 23. The beam weights 14—14 are then adjusted so that hand 11 stands at the number of pounds desired for the net weight of liquid content in the filled drum. Then the outer telescoping member 23 is pushed downwardly into the drum and bleeder valve 59 is closed. The closing of the bleeder valve results in the opening of valve 20 and liquid is forced into the drum. While the drum is filling, the attendant may go about his other duties, such as bringing up new empty drums, closing the filled ones, marking them, and placing them in position to be loaded on trucks, since it is not necessary for him to keep his eyes on the dial of the scale.

When the drum is full, blade 40 is moved between the air jets, as indicated above. Although in theory it does require some force to push the blade into the stream of escaping air, practically, if air pressure in line 52 is kept properly low by means of reducing valve 51 and if the jets are nicely balanced, the force required is imperceptible and has no adverse effect whatever upon the accuracy of the scale. As has been shown, this motion of the blade results in the closure of valve 20, and the attendant is notified that the drum is full by the momentary sound of air escaping through port 57, by the cessation of the sound of running liquid, or by a glance at the dial of the scale. He then lifts member 23 until groove 24 and spring 25 engage one another. This enables him to move the full drum from the platform and, by the opening of valve 59, prevents valve 20 from opening when the weight is removed. Another empty drum is then placed on the platform and the process is repeated.

Dehydrator 29 is a conventional installation in compressed air systems, and it requires no attention except an infrequent opening of the drain cock to remove condensed water.

We have found that our apparatus operates with the greatest of dependability and that its accuracy is limited only by the accuracy of the scale itself. It may be used with inflammable liquids without creating any additional fire hazard. It does not require unduly great installation expense, since compressed air lines are standard equipment in most modern industrial establishments, particularly in oil refineries, where our apparatus is especially useful.

It is to be understood that our invention is not to be considered limited to the exemplary embodiment shown and described and that such changes as come within the scope of the appended claims may be made without departing from the spirit of the invention.

We claim as our invention:

1. Apparatus for filling containers with predetermined net weights of fluid material, comprising: weighing apparatus having a platform and a moving beam responsive to changes of weight on said platform; a fluid-supply line adapted for filling a container placed on said platform; a valve in said fluid-supply line; a motor for said valve; an air line ending with opposed, balanced jets; means actuated by an increase of pressure in said air line for causing said motor to close said valve; and a blade associated with said beam and arranged to move between said jets and to impede the release of air therefrom when said beam reaches a predetermined position.

2. Apparatus for filling containers with predetermined net weights of fluid material, comprising: weighing apparatus having a platform and a moving beam responsive to changes of weight on said platform; a fluid-supply line including a movable member adapted for communication with a container placed on said platform; a valve in said fluid-supply line; a motor arranged to open said valve when provided with pneumatic pressure and to close said valve when said pressure is released; an air line connected with said motor; means for releasing air from said line when said beam reaches a predetermined position; and a bleeder valve connected with said air line and arranged to be opened by the motion of said movable member when said movable member is retracted from said container.

ROY B. BRYANT.
RALPH M. ROBESON.
ALBERT B. STEVENS.